(12) United States Patent
Punzel et al.

(10) Patent No.: US 7,770,740 B2
(45) Date of Patent: Aug. 10, 2010

(54) SUPPORT ARRANGEMENT FOR THE LOWER END OF AN UPRIGHT ELONGATED ARTICLE, SUCH AS A FIREARM OR RELATED ACCESSORY

(75) Inventors: William H. Punzel, Edgerton, WI (US); Matthew A. Tourdot, Whitewater, WI (US); Brian R. Nemec, Delevan, WI (US); Donald T. Neste, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 815 days.

(21) Appl. No.: 11/340,257

(22) Filed: Jan. 26, 2006

(65) Prior Publication Data

US 2007/0170129 A1 Jul. 26, 2007

(51) Int. Cl.
*A47F 7/00* (2006.01)
(52) U.S. Cl. .................................................. 211/64
(58) Field of Classification Search ............... 211/64, 211/60.1, 4, 68, 175, 189, 20, 23, 24, 86.01; 206/317; 224/913; 42/94; 248/154, 346.03, 248/346.06
See application file for complete search history.

(56) References Cited

U.S. PATENT DOCUMENTS

| 554,252 | A |   | 2/1896 | Falk |  |
|---|---|---|---|---|---|
| 1,202,588 | A |   | 10/1916 | Roberts |  |
| 1,951,255 | A |   | 3/1934 | Parker |  |
| 2,070,904 | A |   | 2/1937 | Jennings |  |
| 2,623,639 | A |   | 12/1952 | Levy |  |
| 2,783,896 | A | * | 3/1957 | Agostini et al. | ............... 211/64 |

(Continued)

FOREIGN PATENT DOCUMENTS

DE 19541951 5/1997

(Continued)

OTHER PUBLICATIONS

"Multitrack Multiple Weapons Storage Rack", U.S. Government, DSN 482-5860/5768, May 17, 2000, 18 pages.

*Primary Examiner*—Jennifer E. Novosad
(74) *Attorney, Agent, or Firm*—Andrus, Sceales, Starke & Sawall, LLP

(57) ABSTRACT

A support for the lower ends of elongated articles stored in an upright position, such as the lower ends of firearms contained within a storage cabinet. The support includes a base, and one or more support members are releasably engageable with the base. Each support member receives and secures the lower end of a firearm relative to the base. Each support member is releasably engaged with the base via one or more releasable fasteners that extend through openings in the base and the support member. The base may include a series of slots, within which the fasteners are movable to adjust the position of the support members on the base. The one or more support members may be a single support member that supports the lower end of each firearm, and a series of support members are mounted along the length of the base to support the lower end of a series of articles. Alternatively, the one or more support members may be a pair of support members that cooperate to define the upwardly facing recess within which the lower end of the firearm is received, and which may be moved together and apart in the slots to accommodate differently dimensioned firearms.

10 Claims, 11 Drawing Sheets

U.S. PATENT DOCUMENTS

| | | | | |
|---|---|---|---|---|
| 2,855,108 | A | 10/1958 | Haapala | |
| 2,958,422 | A | 11/1960 | Caloiero et al | |
| 3,031,069 | A * | 4/1962 | Hirsch | 206/317 |
| 3,361,265 | A * | 1/1968 | Wernimont | 211/64 |
| 3,913,746 | A * | 10/1975 | Burton | 211/64 |
| 3,917,071 | A | 11/1975 | Walters | |
| 4,113,107 | A | 9/1978 | Jaeger | |
| 4,132,315 | A | 1/1979 | Young | |
| 4,174,042 | A | 11/1979 | Fair | |
| 4,181,221 | A | 1/1980 | Tennant | |
| 4,449,314 | A * | 5/1984 | Sorensen | 42/94 |
| 4,461,385 | A | 7/1984 | Clouser | |
| 4,502,656 | A * | 3/1985 | Zeitler | 248/346.03 |
| 4,792,050 | A | 12/1988 | Allen | |
| 4,819,359 | A * | 4/1989 | Bassett | 42/94 |
| 5,265,950 | A | 11/1993 | Atkinson | |
| 5,520,291 | A | 5/1996 | Graham | |
| 5,644,862 | A * | 7/1997 | Folmer | 42/94 |
| 5,680,939 | A | 10/1997 | Oliver | |
| 5,697,181 | A * | 12/1997 | Savant | 42/94 |
| 5,779,120 | A * | 7/1998 | Morford | 224/571 |
| 5,819,462 | A | 10/1998 | Dockery | |
| 5,979,846 | A | 11/1999 | Fluhr | |
| 6,129,252 | A * | 10/2000 | Jackson et al. | 224/406 |
| 6,415,932 | B1 * | 7/2002 | Fiscus et al. | 211/64 |
| 6,457,618 | B1 * | 10/2002 | Hancock et al. | 224/401 |
| 6,860,055 | B1 | 3/2005 | Walrath | |
| 6,863,187 | B1 | 3/2005 | Robertson | |
| 6,868,975 | B2 | 3/2005 | Sells | |
| 6,986,446 | B2 * | 1/2006 | Murray et al. | 224/275 |
| 2003/0150830 | A1 * | 8/2003 | Crown et al. | 211/175 |
| 2003/0150972 | A1 * | 8/2003 | Murray et al. | 248/682 |
| 2004/0045914 | A1 | 3/2004 | Sells et al. | |
| 2005/0145585 | A1 * | 7/2005 | Pintar | 211/64 |
| 2005/0167378 | A1 * | 8/2005 | Scott | 211/64 |
| 2005/0230334 | A1 * | 10/2005 | MacDonald et al. | 211/64 |
| 2007/0000851 | A1 * | 1/2007 | Matzick | 211/64 |

FOREIGN PATENT DOCUMENTS

DE 19700330 7/1997

* cited by examiner

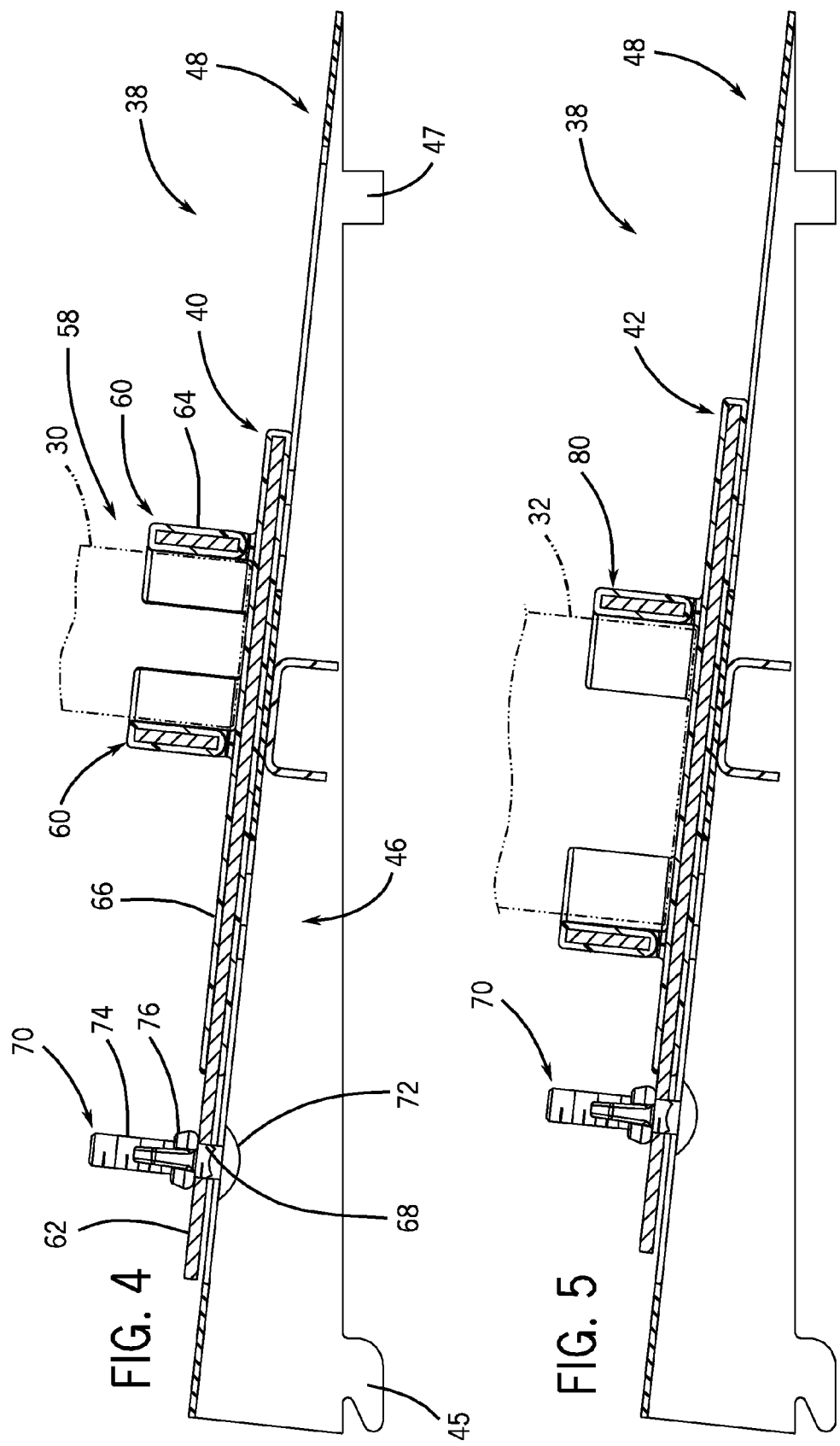

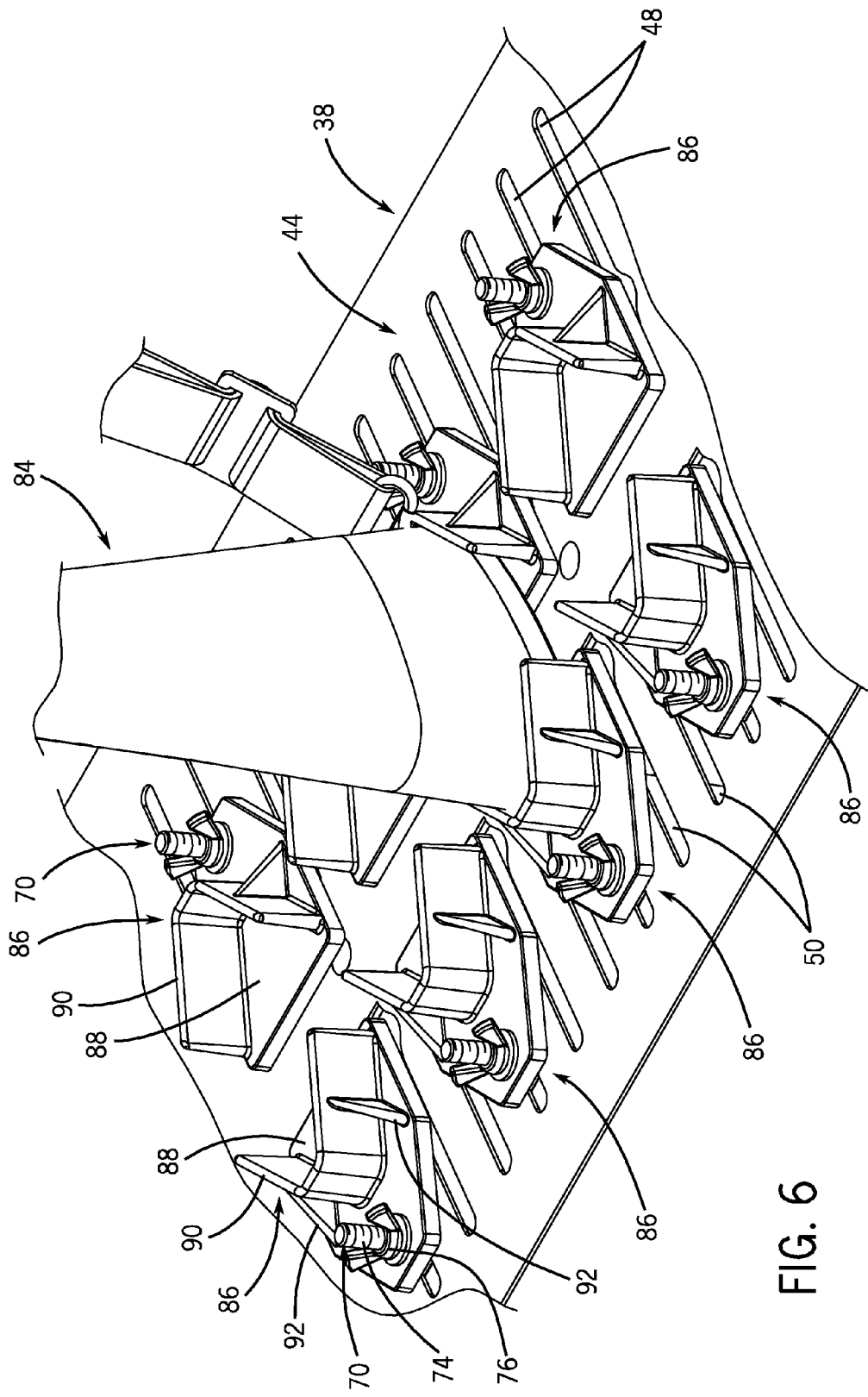

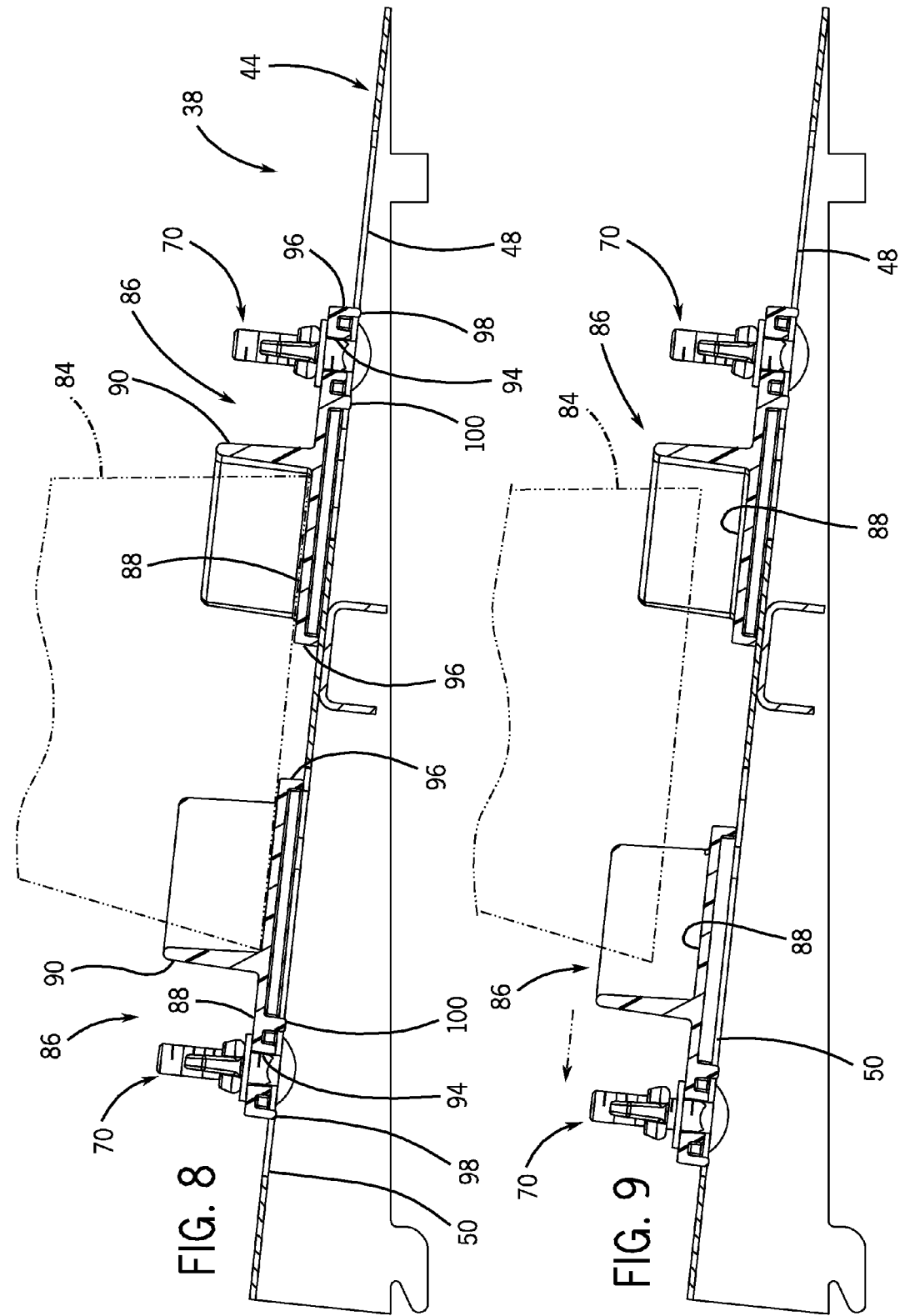

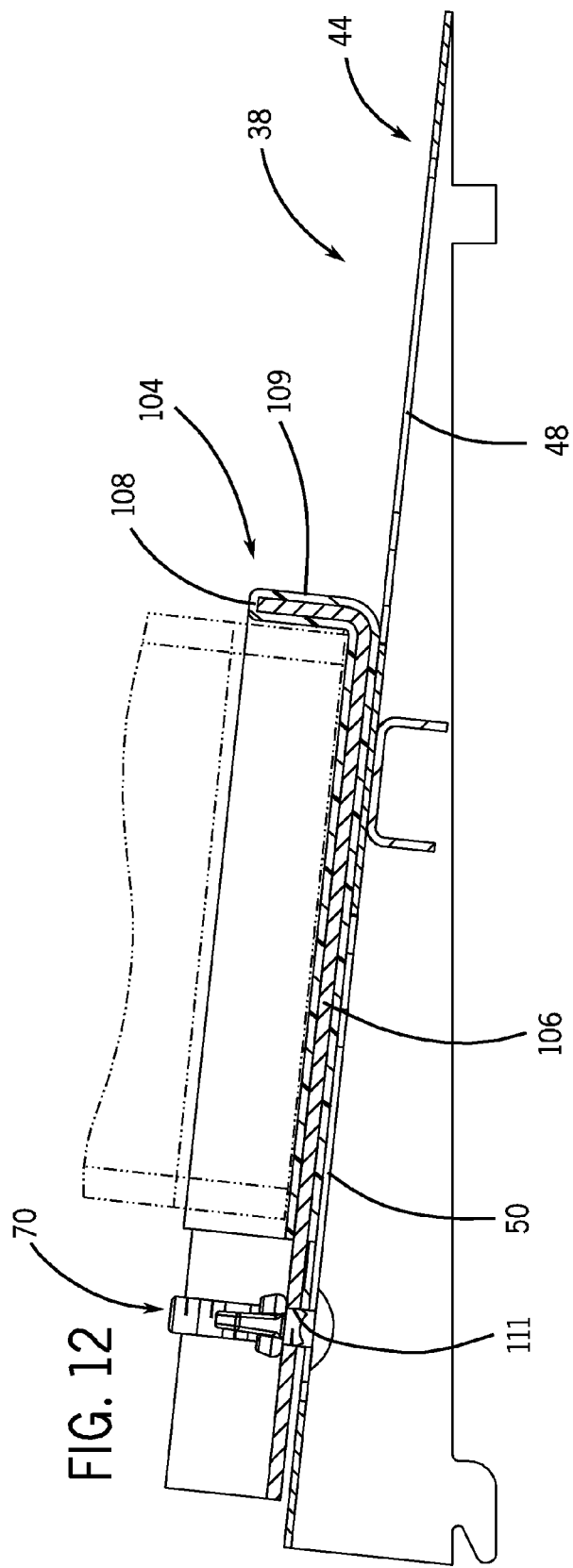

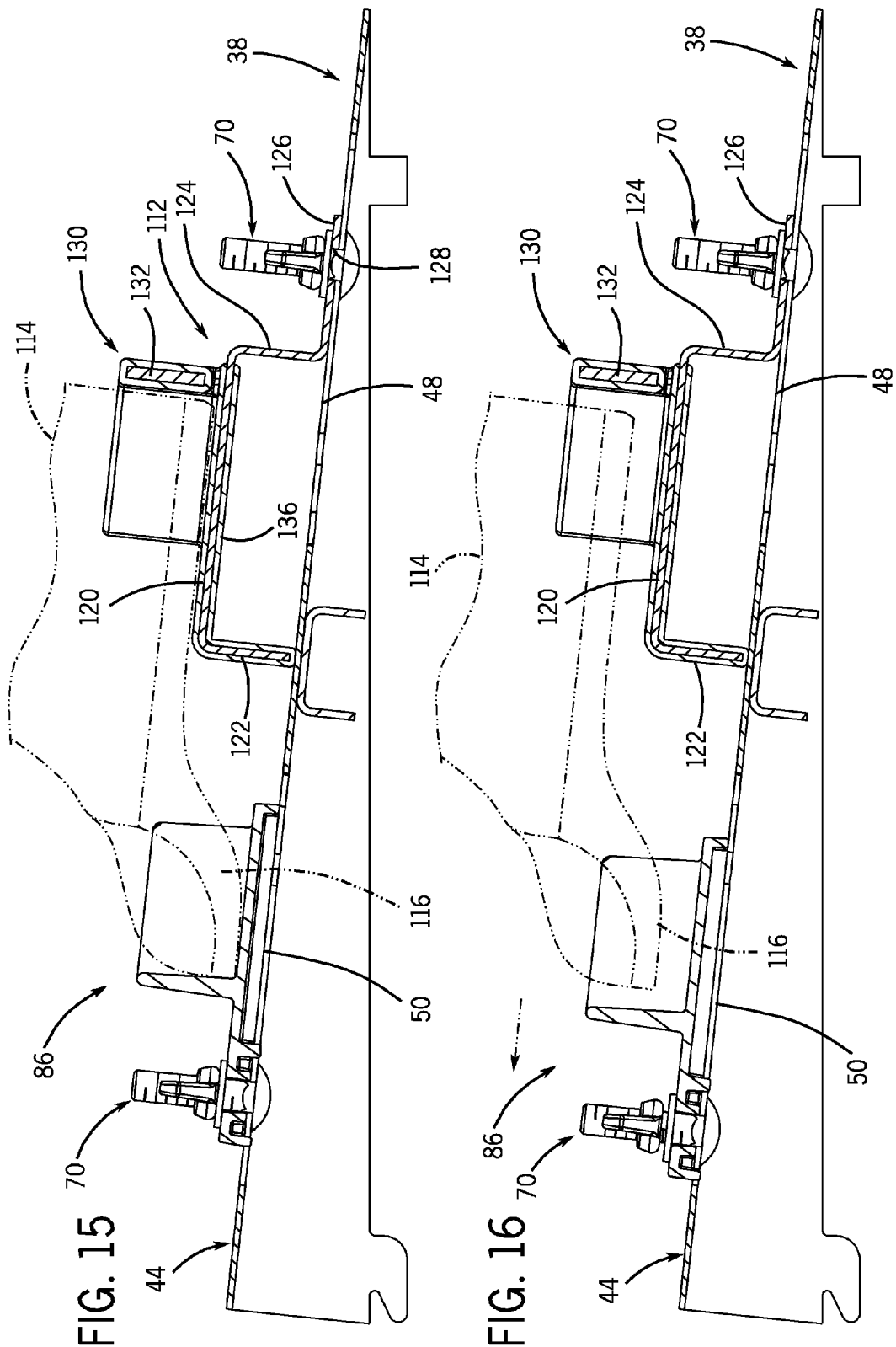

SUPPORT ARRANGEMENT FOR THE LOWER END OF AN UPRIGHT ELONGATED ARTICLE, SUCH AS A FIREARM OR RELATED ACCESSORY

BACKGROUND AND SUMMARY OF THE INVENTION

This invention relates to a support arrangement for engaging and maintaining in position the lower end of an article in an upright orientation, such as the lower end of a firearm supported on a rack or within the interior of a cabinet.

A wide variety of firearms, such as rifles, machine guns or related accessories, are often employed in military applications and must be stored when not in use. In the past, it has been known to provide a cabinet or the like that defines an interior within which the firearms and related accessories are stored when not in use. Typically, a certain type of cabinet or rack is provided to store a number of a certain type of firearm or accessory, and is fitted with appropriate components to store the particular type of firearm or accessory in an upright orientation. This can create wasted space, in that there may not be a sufficient number of a certain type of firearm or accessory to fill an entire cabinet or rack. In certain environments, such as aboard a transport or in a ship or other ocean-going vessel where space is at a premium, such wasted space is especially undesirable.

It is an object of the present invention to provide a support arrangement for the lower end of an elongated article, such as a firearm in the form of a rifle, machine gun or related accessory, which is to be secured within or on a cabinet or rack. It is another object of the invention to provide such a support arrangement which can quickly and easily be modified or reconfigured to accommodate different types of firearms or accessories. Yet another object of the invention is to provide such a support arrangement which is modular in nature, to allow use of different types of support components for different types of firearms or accessories. Yet another object of the invention is to provide such a support arrangement which can be adjusted to vary the upright position of the supported article. A still further object of the invention is to provide such a support arrangement which is relatively simple in its components and construction, yet which provides efficient use of space and a reconfigurable, adjustable support for securely maintaining an article such as a firearm or related accessory in an upright position.

In accordance with one aspect of the present invention, a lower support for engagement with the lower end of an upright article, such as the lower end of a gunstock, gun body, barrel or the like, includes a base and a support arrangement releasably engageable with the base. The base defines an upwardly facing surface, and is adapted to be positioned within a storage cabinet or the like for storing articles such as firearms or related accessories in an upright position. In one form, the base is secured to a lower wall or floor of the cabinet so as to be fixed in position within the interior of the cabinet.

The support arrangement includes one or more support members, each of which is configured to receive and secure in position the lower end of an upright article to be stored within the cabinet interior. In one embodiment, each support member is mounted to the base via a removable connection arrangement, which enables the support member to be secured to and removed from the base. The releasable connection arrangement may be in the form of one or more fasteners that extend through one or more openings in the support member and in the base. The openings in the base may be in the form of a series of aligned slots within which the one or more fasteners are movable. The fasteners may be provided with heads that maintain the fasteners within the slots while enabling the fasteners to move along the length of the slots, to vary the position of the support member relative to the base.

Each support member includes upstanding support structure that is configured to engage at least a portion of the lower end of the article. In one form, a single support member is provided for the lower end of each article. In this embodiment, the support structure defines spaced apart, opposed support walls between which the lower end of the article is received, and the support walls are configured to engage the lower end of the article to maintain the lower end of the article in position relative to the base. In another form, a pair of support members are provided for the lower end of each article. In this embodiment, each support structure is in the form of a support wall that is configured to receive and engage one area of the lower end of the article. In this manner, the support walls of the pair of support members receive and engage spaced apart areas of the lower end of the article, to maintain the lower end of the article in position. When used in connection with a slot-type mounting arrangement for the base as described above, the pair of support members can be moved toward and away from each other to accommodate articles having differently dimensioned lower ends.

The invention also contemplates a storage cabinet or rack for firearms and related accessories, and a method of supporting the lower end of an elongated article in an upright position, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a section view taken along line 4-4 of FIG. 3;

FIG. 5 is a section view taken along line 5-5 of FIG. 3;

FIG. 6 is an isometric view of another embodiment of the lower end support arrangement in accordance with the present invention;

FIG. 8 is a section view along line 8-8 of FIG. 7;

FIG. 9 is a section view similar to FIG. 8, showing movement of the components of the lower end support arrangement to accommodate differently dimensioned articles;

FIG. 12 is a section view taken along line 12-12 of FIG. 10;

FIG. 15 is a section view taken along line 15-15 of FIG. 14; and

FIG. 16 is s section view similar to FIG. 15, showing adjustment in the position of one of the components of the article support arrangement of FIGS. 13-15.

DETAILED DESCRIPTION OF THE INVENTION

Figure 1:
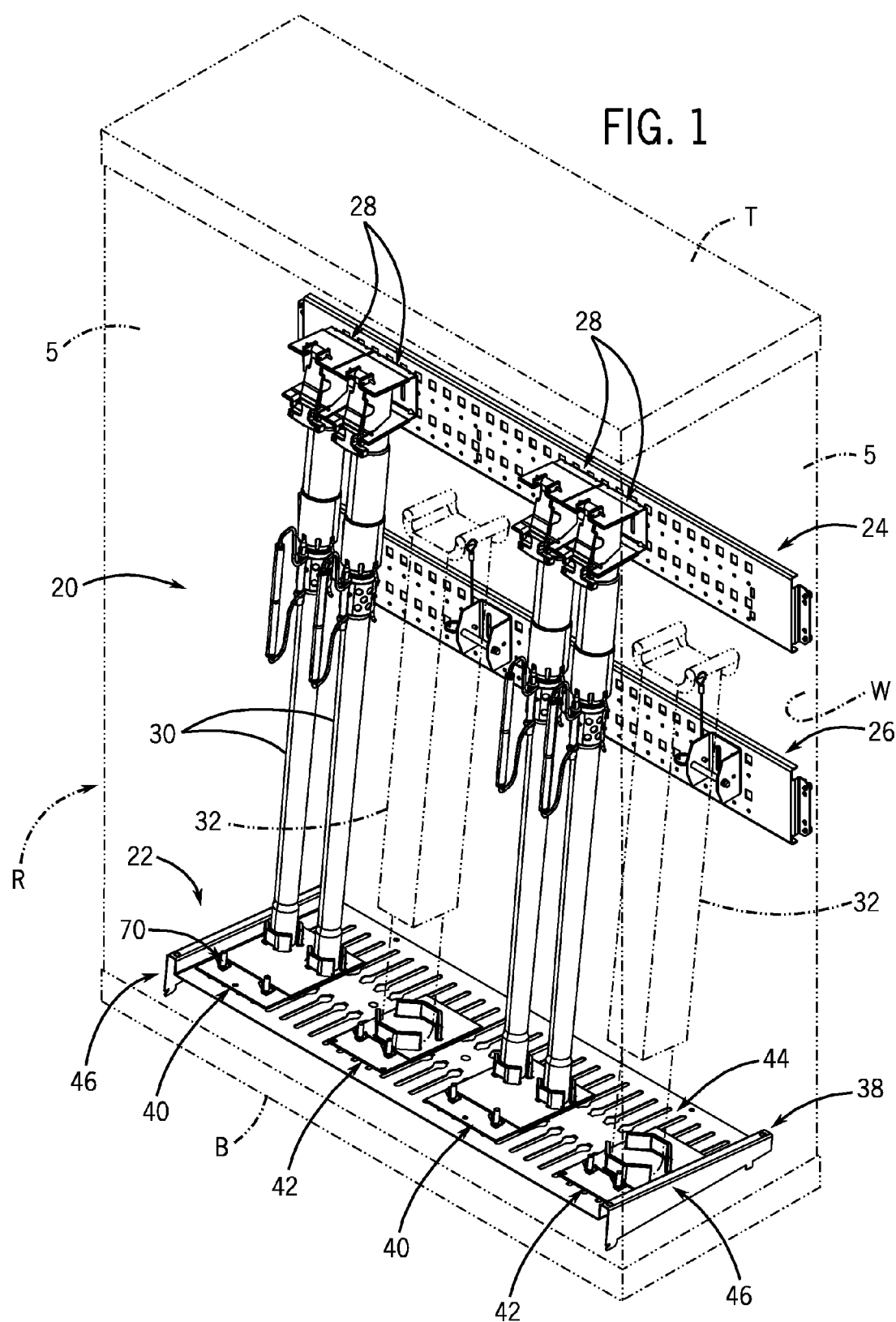
FIG. 1 is an isometric view of an article support system, such as for use in a firearms cabinet or rack, for supporting and maintaining elongated articles such as firearms or related accessories in an upright orientation.

Referring to FIG. 1, a support arrangement for firearms or related accessories is shown generally at 20. Support arrangement 20 is especially well suited for maintaining firearms such as rifles, machine guns or related accessories or components in an upright orientation within an enclosure such as a cabinet or rack, shown in phantom at R (hereafter referred to as rack R for simplicity). The construction of rack R is shown and described in copending application Ser. No. 10/542,129 filed Jul. 13, 2005 (priority application PCT/US2004/009142 filed Mar. 25, 2004), the disclosure of which is hereby incorporated by reference. Generally, rack R includes a bottom B, a top T, a pair of sides S and a back wall W, which cooperate to define an interior within which support arrangement 20 is located. In a manner as is known, bottom B of rack R defines an upwardly facing lower wall that defines the lower extend of the interior of rack R.

Support arrangement 20 includes a lower end support 22 and a pair of upper supports located above lower end support 22. The upper supports include an upper support rail 24 and a lower support rail 26.

Upper support rail 24 and lower support rail 26 define spaced apart ends that are mounted to corner posts associated with cabinet or rack R. As shown and described in the copending '129 patent application, upper support rail 24 and lower support rail 26 can be adjustably mounted at different heights within the interior of rack R, according to the configuration of the articles to be stored within the interior of rack R. A series of article retainers, in the form of upper retainer assemblies 28, are mounted to upper support rail 24. Each retainer assembly 28 is configured to receive and engage the upper end of an article contained within the interior of rack R. As shown in FIG. 1, the articles are in the form of gun barrels 30 which are adapted to be assembled to gun bodies 32, which are contained within the interior of rack R. Other types of firearms or related accessories can also be contained within the interior of rack R and supported by support arrangement 20.

Each gun barrel 30 or gun body 32 defines a lower end that is engaged with and supported by lower support 22, and an upper end spaced above the lower end. The upper end of each gun body 32 is engaged with lower rail 26 so as to be maintained in an upright orientation within the interior of rack R. The upper end of each gun barrel 30 is engaged with one of upper retainer assemblies 28, to maintain the gun barrels 30 in an upright orientation within the interior of rack R.

The construction and operation of each upper retainer assembly 28 is shown and described in copending application Ser. No. 11/340,240, filed Jan. 26, 2006, the disclosure of which is hereby incorporated by reference. It is understood, however, that the upper ends of gun barrels 30 may be secured in any satisfactory manner so as to support gun barrels 30 in the upright orientation as shown.

In accordance with the present invention, lower end support 22 includes a base 38 in combination with a series of lower end support members. In the embodiment of FIG. 1, the lower end support members are in the form of a pair of barrel end supports 40 and a pair of gun body end supports 42.

As shown in FIG. 1, base 38 includes an upwardly facing support wall 44 and a pair of end walls 46. Representatively, base 38 may be formed of sheet metal in a stamping and bending operation, although it is understood that any other satisfactory material and forming method may be employed. In the illustrated embodiment, the lower edge of each end wall 46 includes a notched tab 45 at its outer end and a rectangular tab 47 at its inner end. In a manner as is known, tabs 45, 47 are adapted for engagement within slots formed in the upper wall of cabinet bottom B, for releasably mounting base 38 within the interior of rack R.

End walls 46 are formed so as to have a greater height at the front or outer end of rack R and a lesser height at the rear or inner end of rack R. In the illustrated embodiment, end walls 46 have a trapezoidal configuration. With this construction, support wall 44 of base 38 is at an angle relative to the upper wall defined by bottom B of rack R and relative to the back wall W. Representatively, the angle of support wall 44 is such that support wall 44 lies in a plane that is generally perpendicular to the longitudinal axis of each article, such as gun barrels 30 and gun bodies 32, that is engaged with and supported by lower support 22.

Figure 2:
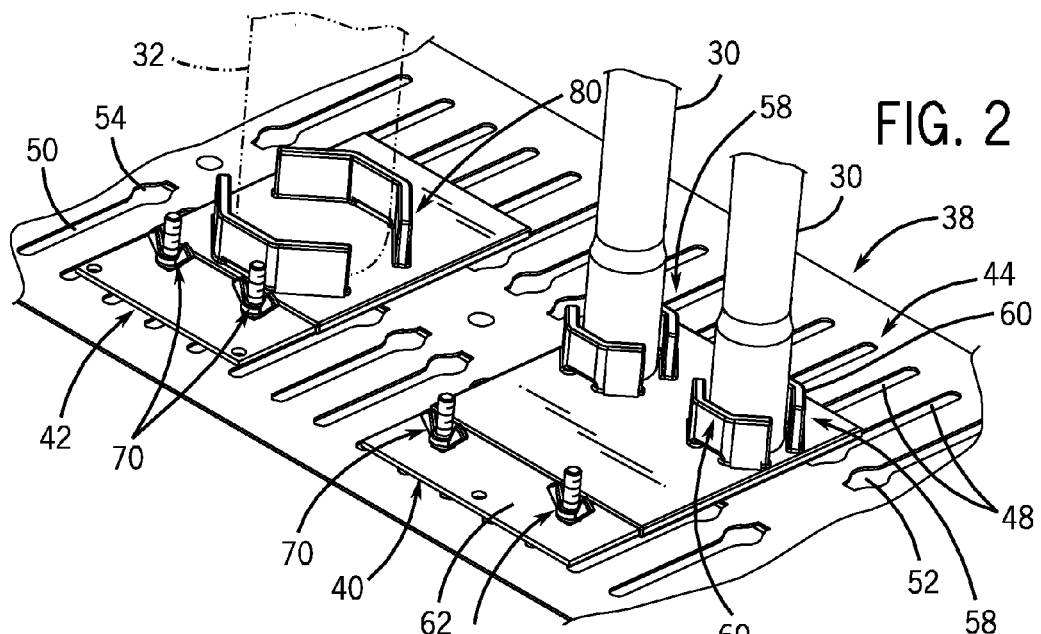
FIG. 2 is an enlarged partial isometric view of a base and lower end support arrangement in accordance with the present invention, which forms a part of the article support system of FIG. 1 and engages the lower ends of the elongated articles to maintain the articles in a desired position within the cabinet or rack.
Figure 3:
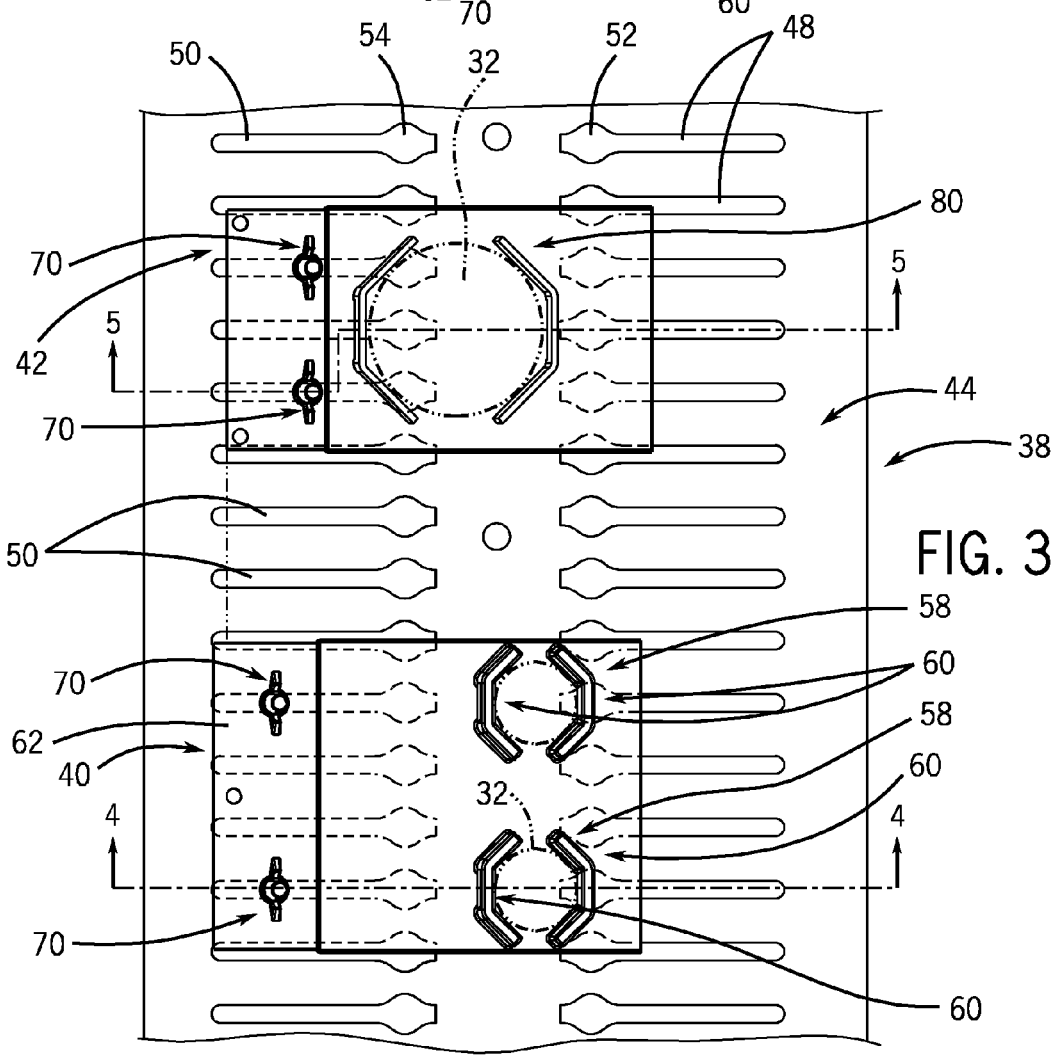
FIG. 3 is a top plan view of the lower end support arrangement of FIG. 2.
Figure 7:
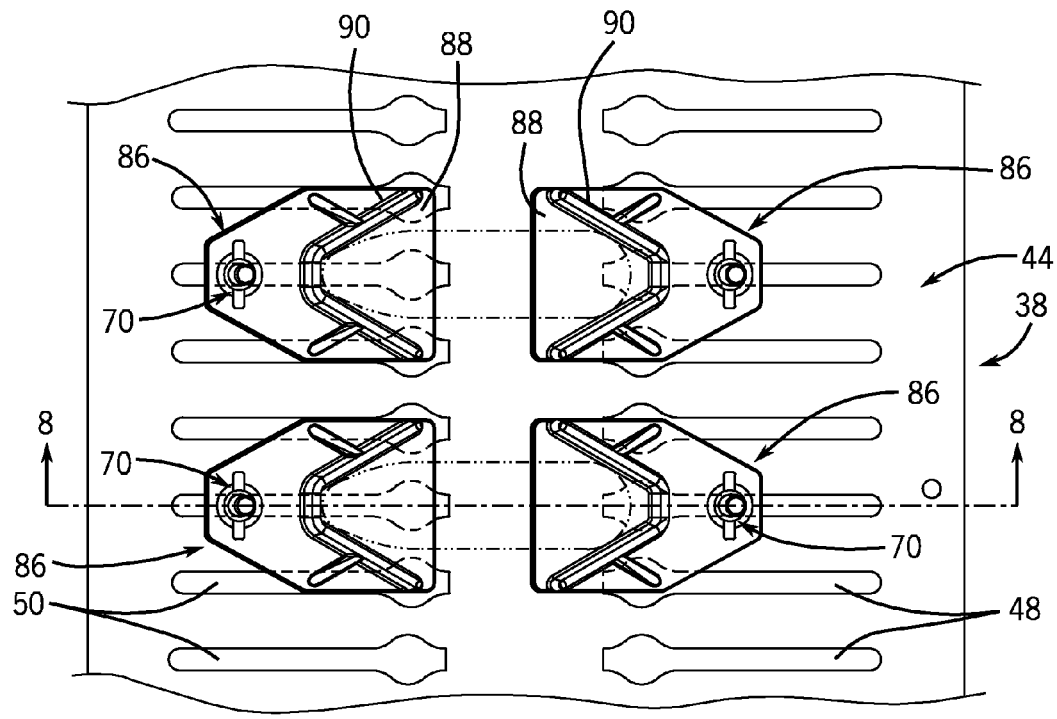
FIG. 7 is a top plan view of the lower end support arrangement of FIG. 6.

As shown in FIGS. 2 and 3, support wall 44 is formed with a series of laterally spaced slots 48 and a series of laterally spaced slots 50. Each slot 48 is axially spaced from and aligned with one of slots 50. Each slot 48 defines an enlarged entrance area 52, and each slot 50 defines an enlarged entrance area 54. Representatively, slots 48, 50 and entrance areas 52, 54 are formed in a stamping operation, although it is understood that any other satisfactory forming method may be employed.

Referring to FIGS. 2-4, each barrel end support 40 includes a pair of barrel end receivers 58, which are defined by a pair of upstanding, spaced apart receiver walls 60, each of which is generally U-shaped. The end of each receiver wall 60 is spaced from the end of the adjacent receiver wall 60, to define an open area therebetween. In the illustrated embodiment, each barrel end support 40 includes a generally flat, rectangular plate 62, and each receiver wall 60 is formed by a rigid, U-shaped member 64 that is secured to the upper surface of plate 62 in any satisfactory manner, such as by welding. Each barrel end support 40 further includes a coating of resilient material 66 that is applied to the top and bottom surfaces of plate 62 and to barrel end receivers 58, such as in a dip-type coating operation in a manner as is known. The resilient material 66 may be a material such as urethane, which provides resilient, cushioned support for the ends of gun barrels 30, although it is understood that any other satisfactory material and coating method may be employed. The uncoated portion of plate 62 defines a mounting area that is used to secure barrel end support 40 to base 38.

In the illustrated embodiment, the exposed portion of plate 62 is formed with a pair of openings 68, which are spaced apart by a distance corresponding to the distance between a desired number of slots 48 or 50. Representatively, openings 68 are formed so as to correspond to the spacing between four of the slots 48 or 50. A releasable engagement arrangement is utilized to releasably and adjustably secure barrel end support 40 to base 38. In the illustrated embodiment, the releasable engagement arrangement is in the form of a pair of threaded fasteners 70, each of which includes a head 72 and a shank 74. The head 72 of each fastener 70 has a transverse dimension greater than that of slots 48 and 50, so that the fastener 70 cannot be pulled through the slot 48 or 50. A threaded engagement member, such as a nut 76, is engaged with the threaded shank 74 of each fastener 70. With this construction, the nuts 76 are tightened to hold the barrel end support 40 in position on base 38, and can selectively be loosened so as to enable the fasteners 70 to be moved within the slots 48 or 50, to vary the axial position of barrel end support 40 relative to base 38.

Barrel end support 40 is engaged with base 38 by first positioning fastener heads 72 over the entrances 52 of a desired set of slots 48, or over the entrances 54 of a desired set of slots 50. The fastener heads 72 are then moved through the slot entrances 52 or 54, and the barrel end support 40 is moved axially relative to base 38 by moving fastener shanks 74 axially within the slots 48 or 50. When barrel end support 40 is in the desired axial position, the user tightens nuts 76, which functions to frictionally engage barrel end support 50 with support wall 44 of base 38. If desired, the user can adjust the axial position of barrel end support 40 by moving fasteners 70 within the selected set of slots 48 or 50, and then retightening nuts 76. The transverse position of barrel end support 40 can also be adjusted by positioning fasteners 70 in a different set of slots 48 or 50.

Each gun body end support 42 is constructed similarly to barrel end supports 40 as described above, with the exception that gun body end support 42 includes a single gun body end receiver 80 as opposed to the two barrel end receivers 58 of barrel end support 40. In all other respects, gun body end support 42 is constructed similarly to barrel end support 40, although having a narrower width so that the openings for the fasteners 70 have a spacing equivalent to the spacing between three of the slots 48 or 50. With this construction, gun body end support 48 is secured to base support wall 44 in the same manner as described with respect to barrel end support 40, and can be adjusted in position both axially and transversely as described above.

FIG. 6 illustrates the lower end of a rifle stock 84, and a pair of rifle stock support members 86 that are employed to engage the lower end of rifle stock 84 so as to maintain the lower end of rifle stock 84 in a desired position on base 38.

Support members 86 perform the same function as barrel end supports 40 and gun body end supports 42 as described previously, but provide an adjustment feature which enables the distance between the pair of supports 86 to be varied according to the dimension of the article, such as rifle stock 84, positioned between and supported by support members 86.

Each support member 86 includes a bottom wall 88, and an upstanding receiver wall 90 that extends upwardly from bottom wall 88. Each receiver wall 90 is generally U-shaped, and may be formed integrally with bottom wall 88 of a thermoplastic material in an injection molding operation, although it is understood that any other satisfactory material or forming method may be employed. Triangular reinforcing walls 92 extend between and are connected to bottom wall 88 and the side areas of receiver wall 90, to strengthen and stiffen receiver wall 90. The area of bottom wall 88 located outwardly of the end of receiver wall 90 includes an opening 94, which is configured to receive a fastener 70 having a construction and operation as described above. Bottom wall 88 of support member 86 may include a peripheral rim 96. An outer guide tab 98 extends downwardly from rim 96, and an aligned inner guide tab 100 extends downwardly from bottom wall 88. Opening 94 is positioned between guide tabs 98 and 100, and guide tabs 98, 100 have a width only slightly less than the width of slots 48 and 50. In this manner, guide tabs 98, 100 are received within the slot 48 or 50 within which fastener 70 is received, so as to position support members 86 in a desired orientation on base 38 and to prevent pivoting movement of support members 86 about fastener 70.

Receiver wall 90 and bottom wall 88 of each support member 86 function to provide a cup-like construction, which generally has a shape that corresponds to the spaced apart areas of rifle stock 84 that are adapted to be engaged by support members 86. As can be appreciated, each support member 86 is engaged within one of slots 48, 50, and the other of the pair of support members 86 is engaged within the aligned one of slots 48, 50. The receiver walls 90 of support members 86 cooperate to define cradles for the top and bottom of the rifle stock 84 when the rifle stock 84 is engaged and received between support members 86, to fix the lower end of rifle stock 84 in position relative to base 38. To accommodate a differently sized gun stock or other article, support members 86 are repositioned within the slots 48, 50 as described above, so as to be moved toward or away from each other to a desired location on base 38. The fasteners 70 are then retightened, to maintain the support members 86 in the desired position.

Figure 11:
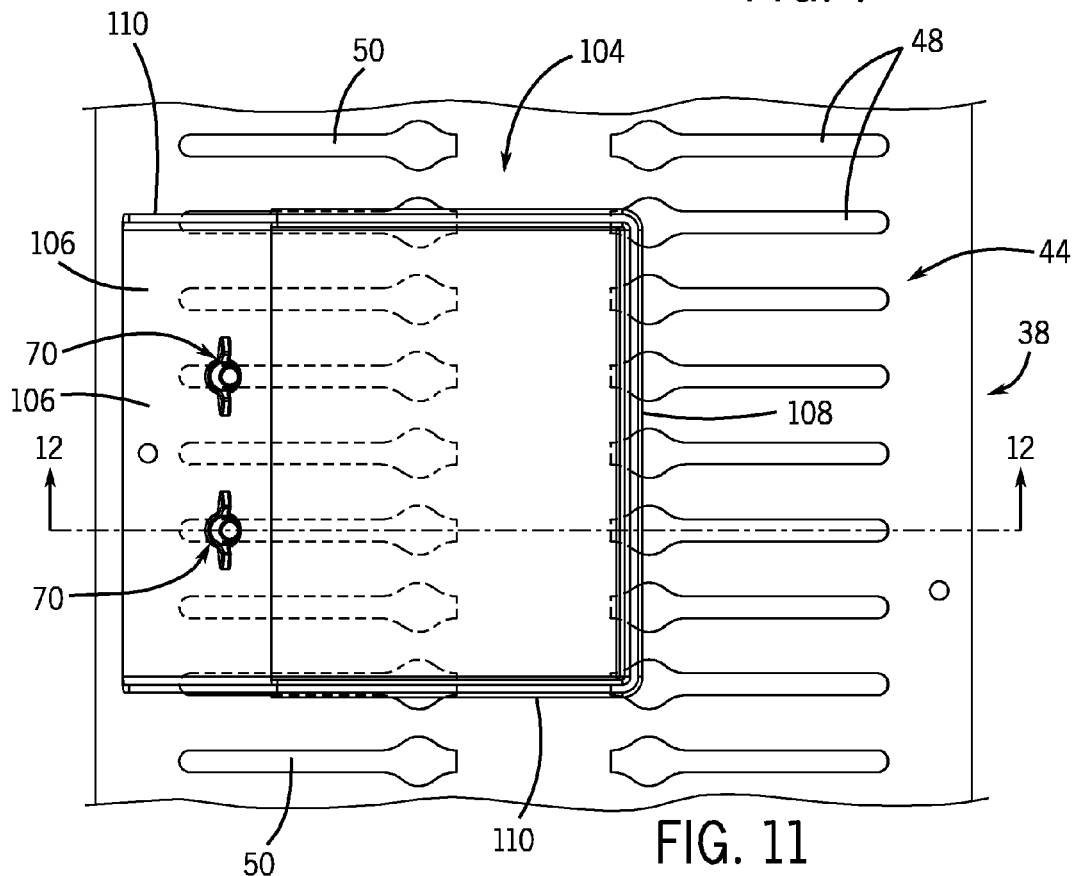
FIG. 11 is a top plan view of the lower end support arrangement of FIG. 10.
Figure 10:
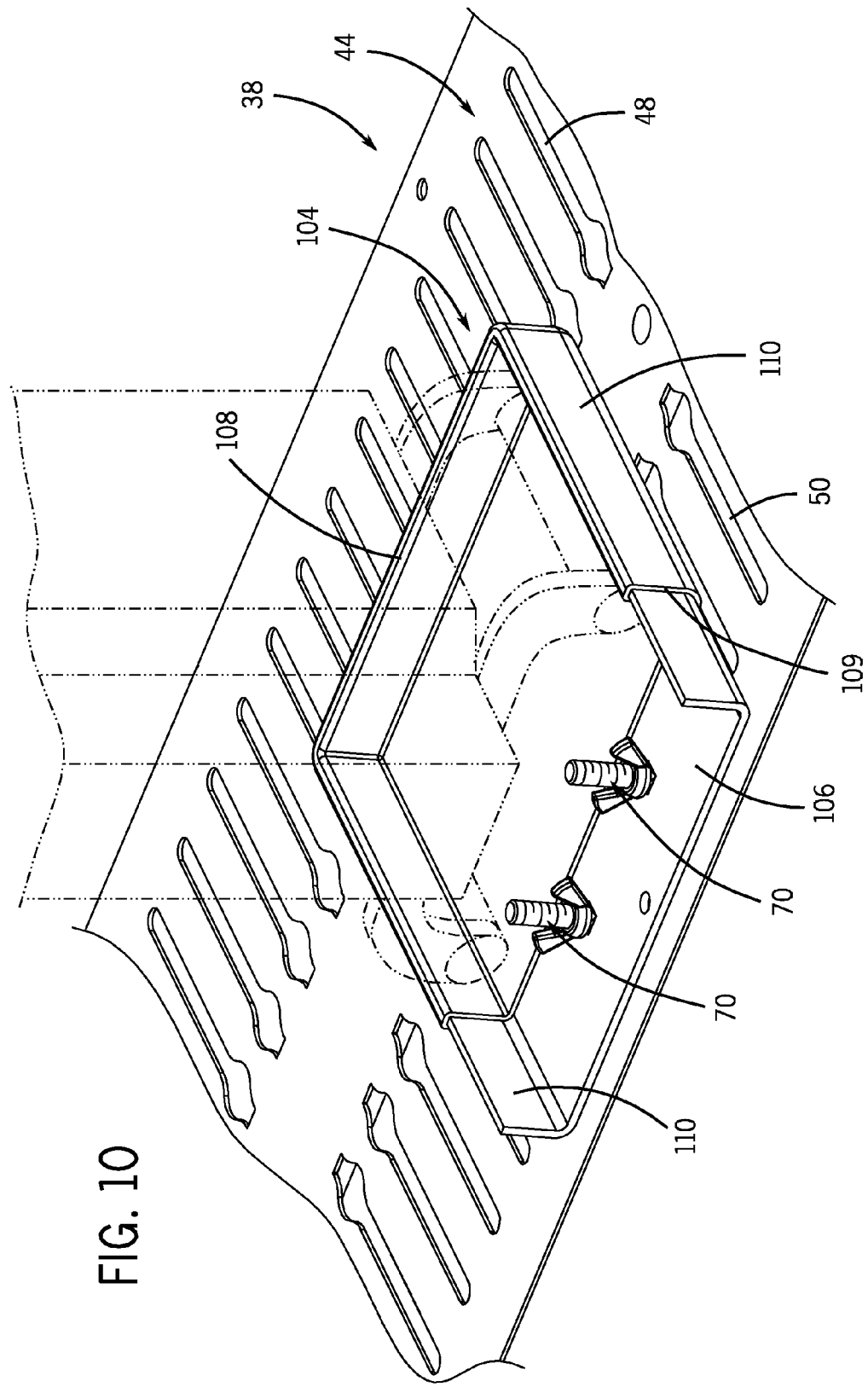
FIG. 10 is an isometric view of another embodiment of a lower end support arrangement in accordance with the present invention.
Figure 13:
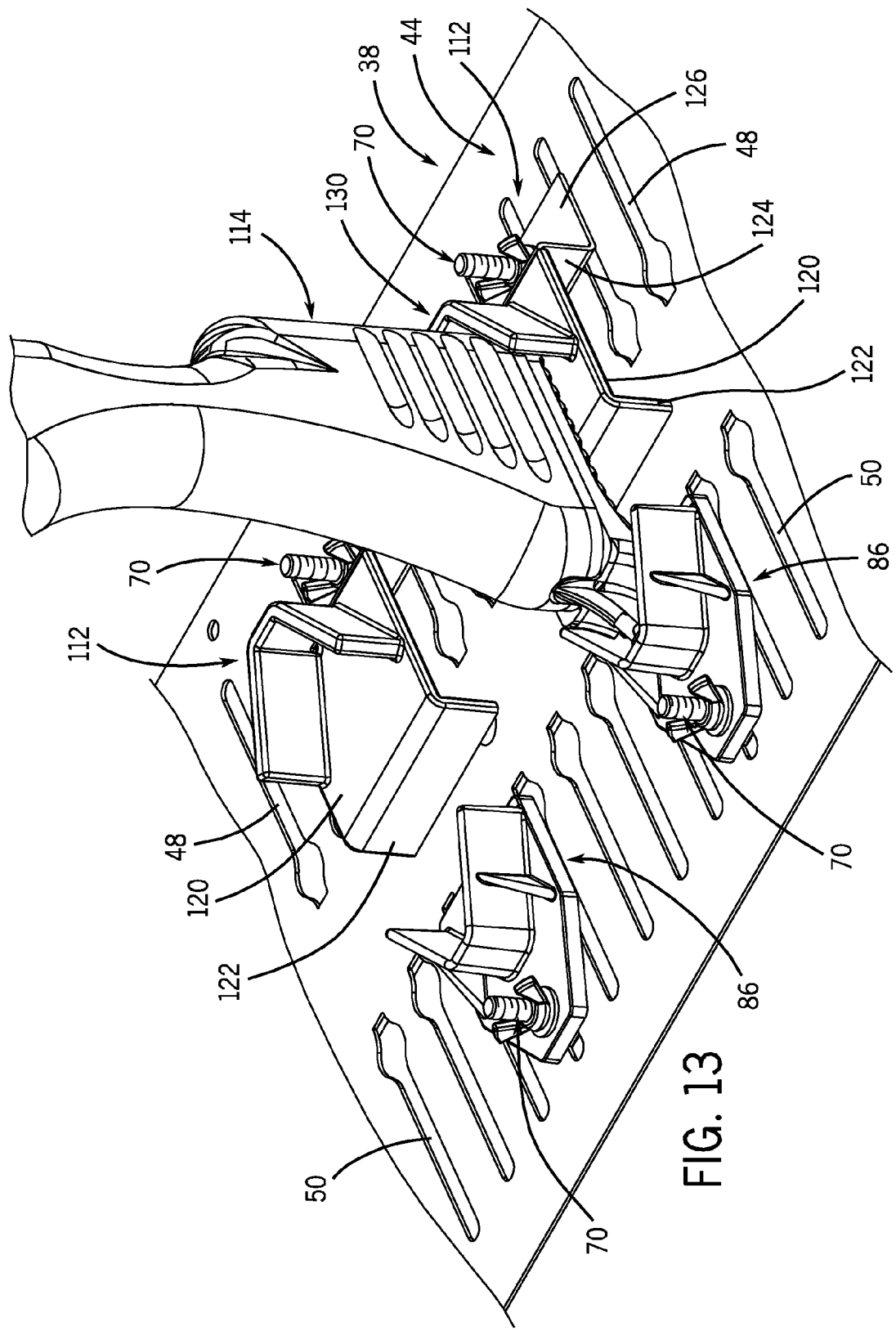
FIG. 13 is an isometric view of another embodiment of a lower end support arrangement in accordance with the present invention.
Figure 14:
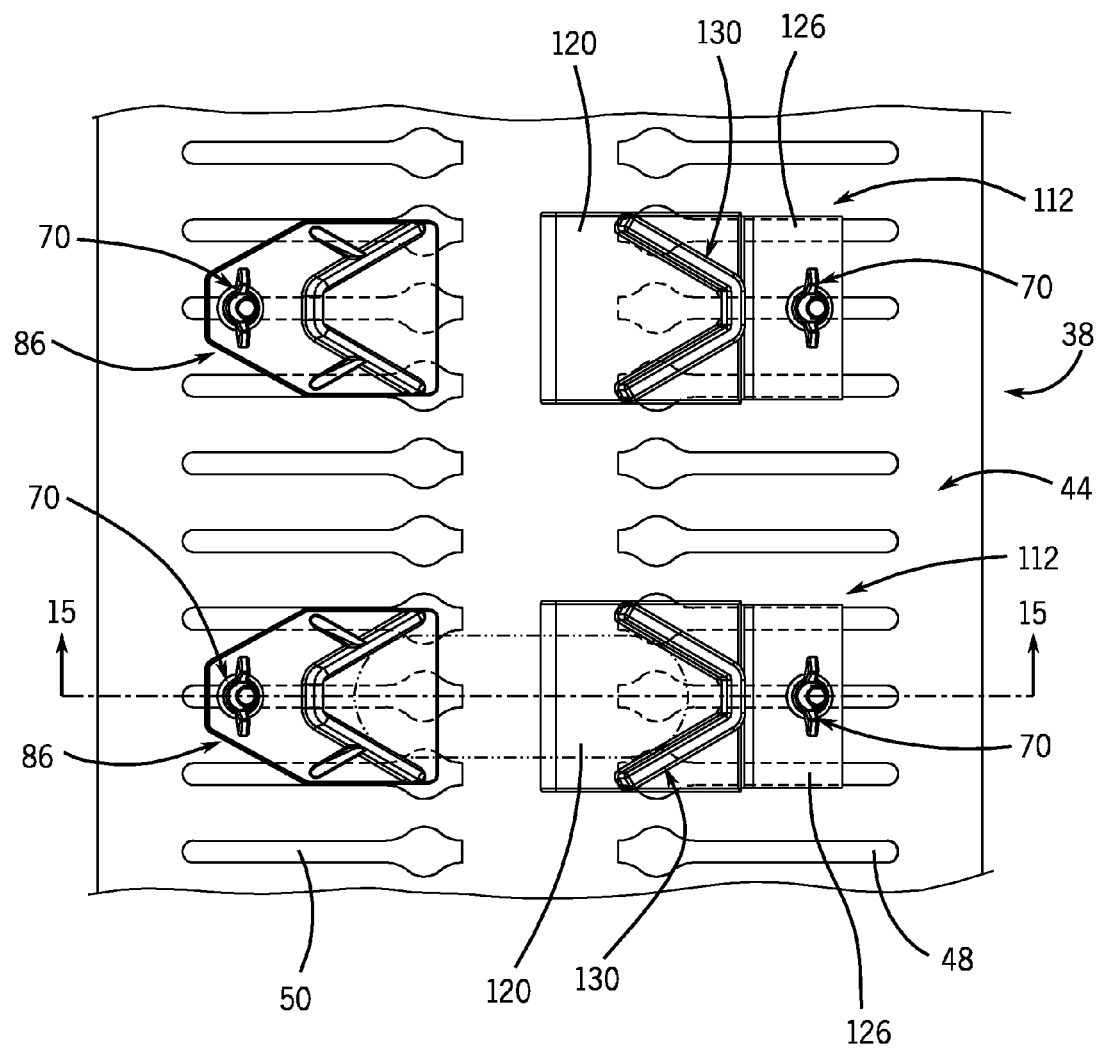
FIG. 14 is a top plan view of the support arrangement of FIG. 13.

Referring to FIGS. 10-12, another embodiment of a lower support member is shown at 104. Support member 104 is constructed similarly to barrel end supports 40 and gun body end supports 42 as described previously, including a generally flat, planar plate 106. In this embodiment, an upstanding end support wall 108 and a pair of upstanding side support walls 110 are formed at one end and at the sides of support member 104. End support wall 108 and side support walls 110 may be formed by upturned edge areas of plate 106. As with barrel end supports 40 and gun body end supports 42, the upper and lower surfaces of plate 106 as well as end support wall 108 and side support walls 110 are coated with a resilient material 109, to provide cushioned, resilient surfaces. The exposed area of plate 106 includes openings 111, which receive fasteners 70 in the same manner as described above to mount support member 104 to base 38, and to enable adjustment in the axial and transverse position of support member 104 on base 38. With the configuration as shown and described, support member 104 defines an upwardly facing open ended recess that is configured to receive the lower end of a firearm such as an MK19.

FIGS. 13-16 illustrate an elevated support member 112 that is adapted to be used in combination with one of support members 86, for use in securing the lower end of a rifle stock 114 that includes a bottom extension 116. In this embodiment, the support member 86 receives and engages the rifle stock extension 116. The opposite area of rifle stock 114 is engaged with and supported by elevated support member 112.

Elevated support member 112 includes an upwardly facing support wall 120 located between a rear spacer wall 122 and a front spacer wall 124. The lower end of front spacer wall 124 is interconnected with a mounting wall 126, which includes an opening 128 configured to receive a fastener 70. A receiver wall 130 extends upwardly from support wall 124. As described above, receiver wall 130 may be formed of a U-shaped receiver member 132 that is secured to the upper surface of support wall 120 in any satisfactory manner, such as by welding, and which has a shape corresponding to the desired final shape of receiver wall 130. Support wall 124 and rear spacer wall 122 are coated with a resilient material 136, which also encloses the receiver wall 130 so as to form a resilient, cushioned surface. Receiver wall 130 is configured to receive and engage the area of rifle stock 114 opposite extension 116, to support rifle stock 114 relative to base 38. Again, as in the previous embodiments, the position of elevated support member 112 can be varied on base 38 by moving the support member within the slots 48, 50 or engaging the support member within different ones of slots 48, 50.

It can thus be appreciated that the present invention provides a single base that can be used in combination with any type and number of support members in order to mix and match the support members with the types of firearms or accessories that are to be contained within the interior of rack R. All of the same types of support members can be used if all of the same types of firearms or accessories are to be contained within the rack R, or different support members can be engaged with the base at different locations along the length of the base to store different types of firearms or related accessories in the interior of the cabinet or rack. The supports can be changed at any time if it is desired to store different types of firearms or accessories within the cabinet or rack, and can easily be repositioned within the interior of the cabinet or rack to vary the locations of the firearms or accessories.

While the drawings and the description disclose certain types of supports that can be secured to the base for engaging and securing the lower ends of certain firearms having a configuration that responds to that of the support, it is understood that the same concept as shown and described can be used to engage and secure differently configured lower ends of different types of firearms or related accessories. That is, the present invention may be employed with differently configured firearms or accessories than those that are shown and described, and the support members are simply modified to have a construction that corresponds to the shape of the lower end of the firearm or accessory that is to be supported. It is also understood that, while the invention has been shown and described with respect to supporting the lower ends of firearms or accessories, the invention may also be used to engage and secure the lower ends of any type of article relative to a base, in which the article is to be maintained in an upright position above the base.

Various alternatives and embodiments are contemplated as being within the scope of the following claims particularly pointing out and distinctly claiming the subject matter regarded as the invention.

We claim:

1. A support arrangement for engagement with the lower end of an upright article, comprising:
    a base defining an upwardly facing surface; and
    one or more flat, planar support members releasably engageable with the base, wherein the one or more support members are configured to receive the lower end of the upright article and secure the lower end of the upright article in position relative to the base, and wherein the one or more support members are movable relative to the base when engaged with the base to adjust the position of the one or more support members on the base,
    wherein the one or more support members are configured to receive the lower end of the upright article within an upwardly facing recess defined by the one or more support members,
    wherein each support member includes a lower wall portion and wherein the upwardly facing recess is defined by upstanding support structure that extends upwardly from and is permanently fixed to the lower wall portion,
    wherein each support member includes a mounting portion extending from the lower wall portion at one end thereof for securing the support member to the base, the mounting portion being defined by and coplanar with the lower wall portion and being spaced from and located outside the upstanding support structure and the recess defined by the upstanding support structure; and
    wherein the mounting portion of each support member is releasably engaged with the base via one or more releasable fasteners that extend only through openings in the base and the mounting portion of each support member.

2. The support arrangement of claim 1, wherein the base includes an upwardly facing wall and wherein the openings in the base comprise a series of slots in the upwardly facing wall of the base, wherein the one or more fasteners are movable within the slots to adjust the position of the one or more support members relative to the base.

3. The support arrangement of claim 2, wherein the fasteners include heads that maintain the fasteners within the slots while enabling the fasteners to move along the length of the slots to vary the position of the one or more support members relative to the base.

4. The support arrangement of claim 1, wherein each support member comprises a single support structure configured to support the lower end of each article, wherein a series of support members are releasably mounted to the base along the length of the base to support the lower end of each of a plurality of articles above the base.

5. The support arrangement of claim 4, wherein the support structure defines spaced apart, opposed support walls between which the lower end of the article is received, wherein the support walls are configured to engage the lower end of the article at a location spaced from the mounting portion of the support member to maintain the lower end of the article in position relative to the base.

6. The support arrangement of claim 5, wherein each support member is releasably engageable with the base via one or more fasteners that extend through one or more openings in the mounting portion and that secure the mounting portion to the base.

7. The support arrangement of claim 6, wherein each support member is releasably engageable with the base via a pair of spaced apart fasteners that extend through a pair of slots, wherein engagement of the pair of fasteners with the pair of slots function to guide movement of the support member within the pair of slots.

8. The support arrangement of claim 1, wherein at least a portion of the one or more support members is provided with a resilient, cushioned support surface.

9. The support arrangement of claim 8, wherein the lower wall portion of the support member and the upstanding support structure is provided with the resilient, cushioned support surface.

10. The support arrangement of claim 8, wherein the mounting portion lies spaced from the resilient, cushioned support surface.

* * * * *